A. G. HERRESHOFF.
COMBINED SPRING PAD AND BRAKE OPERATING CAM SUPPORT.
APPLICATION FILED APR. 24, 1919.

1,369,028.

Patented Feb. 22, 1921.

WITNESS:
Geo Schwartz

INVENTOR
Alexander Griswold Herreshoff
BY
Redding + Greeley
ATTORNEYS

UNITED STATES PATENT OFFICE.

ALEXANDER GRISWOLD HERRESHOFF, OF NEW YORK, N. Y., ASSIGNOR TO INTERNATIONAL MOTOR COMPANY, OF NEW YORK, N. Y., A CORPORATION OF DELAWARE.

COMBINED SPRING-PAD AND BRAKE-OPERATING-CAM SUPPORT.

1,369,028.  Specification of Letters Patent.  Patented Feb. 22, 1921.

Application filed April 24, 1919. Serial No. 292,299.

*To all whom it may concern:*

Be it known that I, ALEXANDER GRISWOLD HERRESHOFF, a citizen of the United States, residing in the borough of Manhattan of the city of New York, in the State of New York, have invented certain new and useful Improvements in Combined Spring-Pad and Brake - Operating - Cam Supports, of which the following is a specification, reference being had to the accompanying drawing, forming a part hereof.

Heretofore, in automobile practice, the bearing for the cam which operates the brake band on the drum has usually been supported by an arm or the like carried on the axle. The strains when the brake is applied have, therefore, been transmitted to the axle and thence through the axle to the suspension springs. The leverage thus imposed on such an arm and the resulting strains transmitted to the springs have been objectionable, and it is the object of the present invention to so mount the brake operating cam as to transmit the strains therefrom directly to the suspension springs. This construction eliminates all undue strains on the axle and the springs and insures the ready and effective absorption of such strains by the springs. The construction of a suitable embodiment of the invention for realizing the described advantages will be described in detail in connection with the accompanying drawing, in which—

Figure 1:
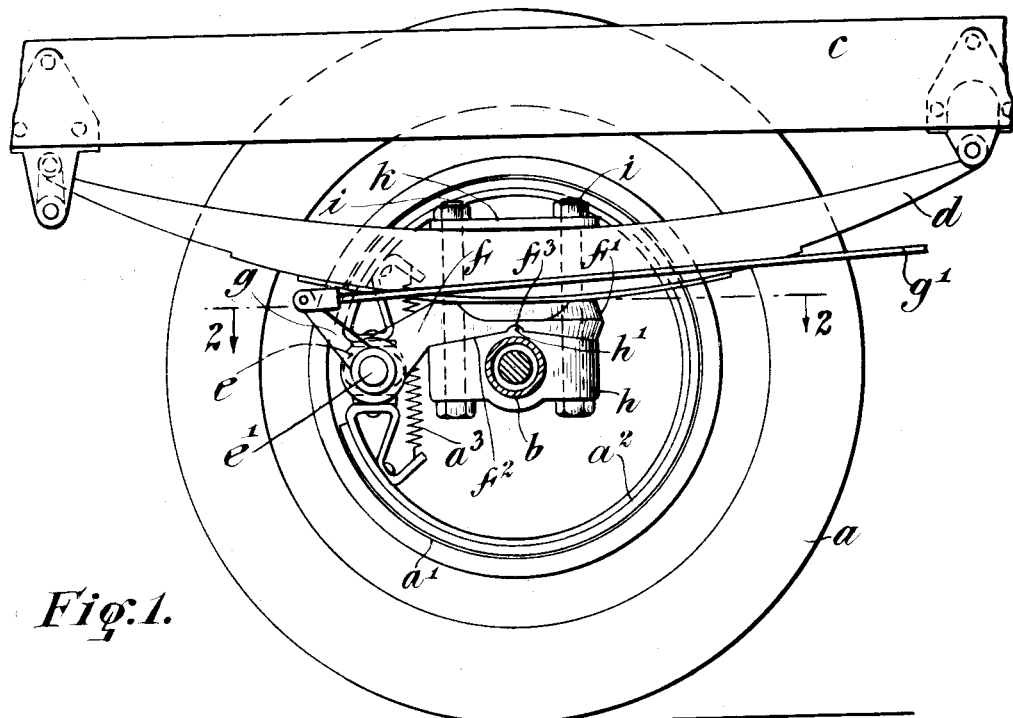
Figure 1 is a view in elevation of so much of a motor vehicle as is necessary for an understanding of the application of the improved pad to the spring.
Figure 2:
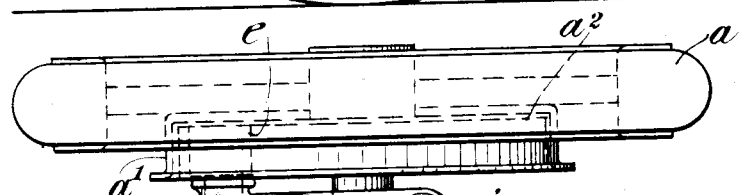
Fig. 2 is a view in plan of the pad shown in Fig. 1, the spring and side frame member being removed.
Figure 3:
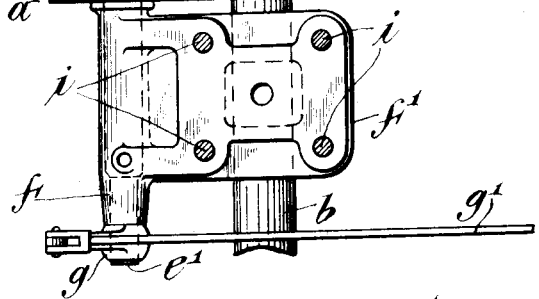
Fig. 3 is a detail view in side elevation of the improved pad.

The wheel $a$ of the motor vehicle, to which the improved pad is illustrated as applied, is carried on an axle $b$ and the frame member $c$ of the vehicle is supported on the axle through the spring $d$, all in a manner usual in automobile practice. On the inner face of the wheel is shown a brake drum $a'$ with which coöperates an internally expanding brake band $a^2$, normally held in released position by means of a spring $a^3$ operatively interposed between the open ends of the band. The brake is expanded and applied by means of a cam $e$, indicated in dotted lines in Fig. 1, and the shaft $e'$ of this cam is journaled in an arm $f$ formed on the improved spring pad, indicated generally by the reference character $f'$. To the end of the shaft $e'$ may be secured an arm $g$ connected with an operating link $g'$ for actuation of the cam $e$ in the usual manner.

The improved combined spring pad and brake operating cam support is mounted on a bolster $h$ carried on the axle $b$ and the spring $d$ rests on the pad. Registering bolt holes are formed in the spring plate $k$, the pad $f'$ and the bolster $h$, and through-bolts $i$ pass through these members and serve to secure them together. These bolts clamp the spring $d$ in position by their engagement with the spring plate $k$ which rests on the spring. The spring pad may have its lower face reversely beveled, as indicated at $f^2$, to engage with the corresponding beveled upper face of the bolster $h$, and may be grooved along sections of its lower face, as at $f^3$, to engage the corresponding tongue $h'$ along the upper face of the bolster $h$. This tongue and groove engagement of the pad and the bolster facilitates the initial assembling of the parts and, with the engaging beveled surfaces, prevents relative movement between these two members.

In use, it will be evident that upon application of the brakes the strain from the cam $e$ will be transmitted through the arm $f$ to the spring pad $f'$ and then imposed directly by the pad upon the supporting spring $d$. The bolster $h$ will conform to this transmission of strain and the axle $b$ will take no part in its transmission. Since the spring $d$ is the resisting member, it is manifestly desirable to have the strain from the brake operating cam thus transmitted directly thereto. Further, there is provided a brake operating cam support which serves the additional function of affording a spring seat, thereby simplifying the construction of motor vehicles in this respect and eliminating parts.

It will be understood that the improved pad may take other forms than that illustrated and may be used in equivalent situations with equivalent parts of different construction, to equal advantage.

The appended claims will define the scope of the invention.

I claim as my invention:

1. In combination with the spring, axle and brake operating cam of a vehicle, a spring pad mounted on the axle between the spring and the axle and provided with a bearing for the brake operating cam.

2. In combination with the spring, axle and brake operating cam of a vehicle, a spring pad mounted on the axle between the spring and the axle and provided with an arm in which there is formed a bearing for the brake operating cam.

3. In combination with the spring, axle and brake operating cam of a vehicle, a spring pad mounted on the axle between the spring and the axle and provided with a bearing for the brake operating cam, and means to secure the spring on the spring pad.

4. In combination with the spring, axle and brake operating cam of a vehicle, a spring pad, a bolster on the axle on which the spring pad rests, means to secure the spring on the pad, and a bearing formed with the pad to support the brake operating cam.

5. In combination with the spring, axle and brake operating cam of a vehicle, a spring pad, a bolster on the axle on which the spring pad rests, a tongue on one of the last named elements and a groove on the other of said last named elements engaging the said tongue, means to secure the spring on the pad, and a bearing formed with the pad to support the spring operating cam.

6. In combination with the spring, axle and brake operating cam of a vehicle, a spring pad having its lower face provided with reversely beveled surfaces, a bolster on the axle having its upper face provided with corresponding reversely beveled surfaces on which the spring pad rests, means to secure the spring on the pad, and a bearing formed with the pad to support the brake operating cam.

7. In combination with the spring, axle and brake operating cam of a vehicle, a spring pad mounted on the axle between the spring and axle and provided with a rearwardly and downwardly extending arm in which there is formed a bearing for the brake operating cam.

This specification signed this 19th day of April, A. D. 1919.

ALEXANDER GRISWOLD HERRESHOFF.